March 22, 1960 C. W. SINCLAIR ET AL 2,929,430
WHEEL RIM
Filed Aug. 13, 1956
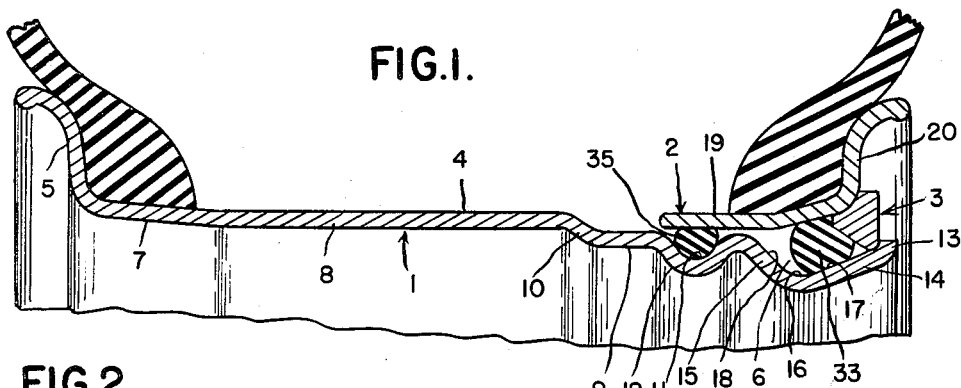
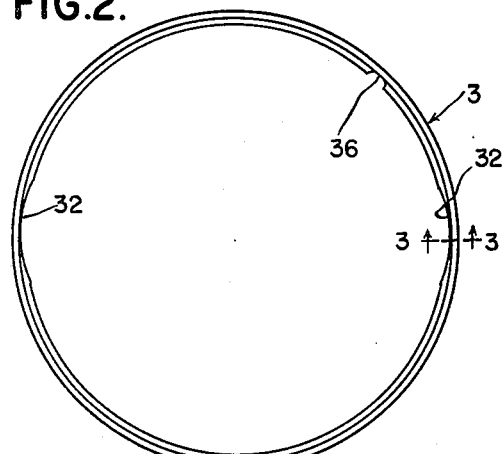
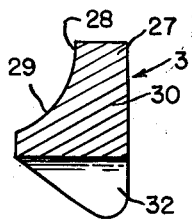
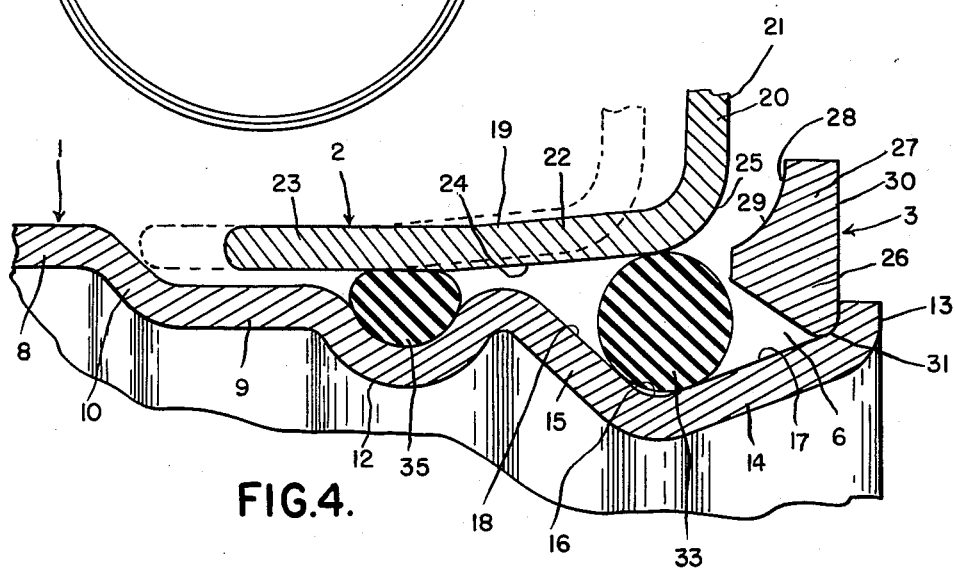
INVENTORS
CHARLES W. SINCLAIR
BY RUPERT L. ATKIN
Whittemore, Hulbert & Belknap
ATTORNEYS

United States Patent Office 2,929,430
Patented Mar. 22, 1960

2,929,430

WHEEL RIM

Charles W. Sinclair, Detroit, and Rupert L. Atkin, Grosse Pointe Woods, Mich., assignors to Kelsey-Hayes Company, a corporation of Delaware Application August 13, 1956, Serial No. 603,514

10 Claims. (Cl. 152—409)

This invention relates to rims and refers more particularly to rims for pneumatic tubeless tires.

The invention has for an object to provide an improved rim constructed to facilitate mounting and demounting the tubeless tire and to maintain air pressure.

The invention has for another object to provide an improved rim for a tubeless tire constructed to prevent the escape of air even under extreme conditions such as when a sharp turn is made at high speed.

The invention has for other objects to provide an improved rim comprising an annular base member, an annular tire retaining member, a sealing member between the base member and tire retaining member for preventing the escape of air therebetween, and a clamping member for positively limiting axially outward movement of the tire retaining member relative to the base member; and to provide a second sealing member between the base member and tire retaining member axially inwardly of the first sealing member to prevent the escape of air even when the tire retaining member moves axially inwardly far enough to break the seal between the first sealing member and the tire retaining member; and to provide an abutment positively limiting the tire retaining member against movement in an axially inward direction far enough to break the seal between the tire retaining member and second sealing member, but permitting sufficient axially inward movement of the tire retaining member for assembly of an endless clamping member in the gutter at the edge of the base member and the subsequent insertion of the first sealing member between the clamping member and the tire retaining member into the gutter at the axially inner side of the clamping member.

These and other objects of the invention will become apparent from the following description taken in connection with the accompanying drawings in which:

Figure 1 is an axial section through a portion of a rim embodying the invention;

Figure 2 is an elevational view of the clamping member;

Figure 3 is a cross-section on the line 3—3 of Figure 2;

Figure 4 is an enlarged view of a portion of Figure 1 showing the parts in a different position.

The rim is designed for use with pneumatic tubeless tires and is adapted to form part of a motor vehicle wheel. In general, the rim comprises the annular base member 1, the detachable annular tire retaining member 2, and the detachable annular clamping member 3 for retaining the tire retaining member on the base member.

The base member is endless and has the annular base 4, the annular tire retaining flange 5 extending generally radially outwardly from one edge of the base and the annular gutter 6 at the other edge of the base. The base 4 is formed with the annular tire bead seat portion 7 flared toward and connecting into the tire retaining flange 5 and the axially extending annular portion 8 leading from the bead seat portion. The annular portion 8 is connected to the axially extending annular portion 9 of smaller diameter by an inclined annular ridge 10 which serves as an abutment for the tire retaining member 2 as explained more fully below. The annular portion 9 is further formed with an annular radially outwardly opening recess 11. The recess 11 is formed by a wall 12 of arcuate cross-section.

The gutter 6 has the axially outer radially outwardly extending terminal wall 13 which has an external diameter preferably less than the external diameter of the annular portion 9, the axially and radially outwardly inclined bottom wall 14 connecting into the terminal wall 13, and the radially outwardly and axially inwardly inclined wall 15 which connects into the annular portion 9 axially outwardly of the recess 11. The gutter 6 has an annular radially outwardly facing well 16 formed by reason of the bottom wall 14 being inclined radially and axially outwardly, and the well is defined by the radially and axially outwardly inclined radially outer surface 17 of the bottom wall and the radially outwardly and axially inwardly inclined radially outer surface 18 of the inclined wall 15.

The detachable annular tire retaining member 2 is endless and is movable over the terminal wall 13. The tire retaining member has the tire bead seat portion 19 and the integral tire retaining flange 20 extending generally radially outwardly from the axially outer edge of the tire bead seat portion and provided with a substantially radial axially outer surface 21. The tire bead seat portion 19 is formed with the part 22 inclined axially and radially outwardly at an angle less than the bottom wall 14 and connecting into the tire retaining flange 20, and is also formed with the axially extending part 23 of a diameter to clear the annular portion 9. The part 22 has the radially inner surface 24 inclined axially and radially outwardly at an angle less than the radially outer surface 17 of the bottom wall of the gutter. The radially inner surface 24 is connected to the axially outer surface 21 by a rounded convex surface 25.

The detachable annular clamping member is endless and is formed of a resilient metal having a body portion 26 and the flange portion 27. The flange portion 27 has a substantially radially extending axially inner surface 28 and the body portion 26 has a concave rounded surface 29 connecting into the axially inner surface 28 of the flange portion and having the same curvature as the rounded surface 25, and a radially extending axially outer surface 30 connecting into a radially inner surface 31 inclined radially and axially outwardly at the same angle as the surface 17 of the bottom wall 14. In the final or completely assembled position of the rim members, the body portion 26 extends between the gutter 6 and the tire retaining member 2 and centers the tire retaining member 2 relative to the base member 1, the radially inner surface 31 engaging the surface 17 of the bottom wall 14 of the gutter, the axially outer surface 30 engaging the radially extending axially inner surface of the terminal wall 13 and the concave surface 29 engaging the convex surface 25. The axially inner surface 28 of the clamping member engages the axially outer surface 21 of the tire retaining member. The minimum and maximum distances between the surfaces 29 and 31 of the clamping member are normally greater before assembly of the rim members than the minimum and maximum distances respectively between the convex surface 25 and the portion of the surface 17 of the bottom wall 14 engaged by surface 31. Therefore, during assembly of the base, tire retaining and clamping members, the clamping member has wedging engagement with the tire retaining member and is contracted against the bottom wall of the gutter and flexes either or both the base and tire retaining members. The clamping member 3 has diametrically opposite clearances 32 in its radially inner edge. The inside diameter of the clamping member is slightly greater than the distance from the bottom of the well 16 to the radially outer edge of the terminal wall 13 at the diametrically opposite side of the rim.

The beads of the tubeless tire firmly engage the tire bead seat portion 7 and the part 22 of the tire bead seat portion 19 to prevent the escape of air along these tire bead seat portions.

To seal the gap between the base member 1 and the tire retaining member 2, we have provided the annular sealing member 33 in the annular space formed by the gutter 6, the tire retaining member 2 and the clamping member 3. The sealing member is an endless resilient stretchable strip of deformable material, such as rubber, and preferably but not necessarily being of circular cross-section. Before the tire is inflated, the tire retaining member 2 and sealing member 33 are in the full line position of Figure 4, and the cross-sectional dimension of the sealing member is such that it is deformed and makes sealing contact with the surface 17 of the bottom wall 14 and the radially inner surface 24 of the tire retaining member and also is deformed and makes sealing contact with the surface 18 of wall 15, to prevent the escape of air while the tire is being inflated. In the final position of the rim members shown in Figure 1, the sealing member is deformed and wedged more firmly between the surfaces 17 and 24 and forms a more effective seal for the gap between the base and tire retaining members.

An annular sealing member 35 is provided in the recess 11. The sealing member 35 is an endless stretchable strip of deformable material, such as rubber, and preferably but not necessarily being of circular cross-section. The sealing member 35 is permanently secured in the recess by any suitable bonding material and in its normal condition is of greater diameter than the distance between the bottom of the recess and the axially extending portion 23 of the tire retaining member so that it is deformed or compressed and makes sealing contact with the bottom of recess 11 and also with the bottom of axially extending portion 23.

The tire retaining member 2 is movable axially inwardly relative to the base member 1, the ridge or abutment 10 positively limiting the axially inward movement of the tire retaining member by engagement with the axially inner edge of the axially extending portion 23 of the tire retaining member (see Figure 4). The sealing member 35 is deformed between and sealingly engages the axially extending portion 23 without interruption during the movement of the tire retaining member between its axially inner limit and its axially outer limit determined by the clamping member 3.

The tubeless tire may be readily mounted on the rim after the sealing member 35 is permanently secured in place in recess 11 and while the tire retaining member 2, the clamping member 3 and the sealing member 33 are removed. The tire retaining member may then be moved over the base member and inserted within the axially outer bead of the tubeless tire at which time the beads of the tubeless tire tightly fit the tire bead seat portions 7 and 19 of the base and tire retaining members respectively so that air cannot escape between the beads and bead seat portions. When the tire retaining member 2 is in an axially inward position to clear the clamping member 3, the clamping member is buttoned on the base member in position in the gutter 6 by placing a portion of the clamping member between the clearances 32 in the well 16 at one side of the base member, and the clamping member is distorted to expand the diametrically opposite portion thereof over the radially outer edge of the terminal wall 13 at the diametrically opposite side of the base member. The clearances 32 facilitate buttoning on of the clamping member. When the clamping member is fully located within the gutter and abutting the terminal wall 13 and the tire retaining member 2 is at its axially inner limiting position shown in dotted lines in Figure 4, the sealing member 33 is expanded over the clamping member 3 and positioned in the well of the gutter. The tire retaining member 2 and the adjacent position of the side wall of the tire may then be allowed to move axially outwardly or manually moved axially outwardly to occupy a preliminary inflatable position of assembly shown in full lines in Figure 4, at which time the sealing member 33 is deformed into sealing engagement with the surface 24 of the tire retaining member and the surfaces 17 and 18 of the walls 14 and 15 of the gutter to seal the gap therebetween. The tire may then be inflated at which time the inflating air acting through the tire against the tire retaining member 2 assures engagement of the clamping member with the terminal wall of the gutter and moves the tire retaining member to its axially outer position over the clamping member shown in full lines in Figure 1. During this axially outward movement, the surface 24 of the tire retaining member acts upon the sealing member to move it to the full line position of Figure 1 and to deform the same into more firm sealing engagement with the surface 24 and the surface 17 of the bottom wall of the gutter and also into firm sealing engagement with the clamping member 3. Since the clamping member is endless rather than split, it will not pinch or otherwise damage the sealing member. The clamping member 3 has a notch 36 in its radially inner edge to facilitate its removal from the base member through insertion of a screwdriver, tire iron, or like instrument into prying engagement, etc.

The abutment 10 is located to allow sufficient axially inward movement of the tire retaining member to enable the insertion of the sealing member 33 into the gutter between the clamping member and tire retaining member. In the event of a sharp turn at high speed, for example, the tire retaining member will tend to move axially inwardly, and it may move inwardly far enough to break or at least reduce the effectiveness of the seal provided by sealing member 33. However, even in the extreme position shown in dotted lines in Figure 4, the sealing member 35 still maintains sealing contact with the axially extending portion 23 of the tire retaining member to prevent the escape of air from the tire. Thus the abutment 10 positively limits the tire retaining member against movement in an axially inward direction far enough to break or impair the seal provided by sealing member 35.

Referring to Figure 4, it will be seen that during hard cornering or side skid when the tire retaining member 2 has moved axially inwardly against abutment 10, that the sealing member 33 retains the clamping member 3 against any substantial axially inward movement away from the terminal wall 13, thus preventing the clamping member from being sprung out of the gutter.

What we claim as our invention is:

1. A rim for a tubeless tire comprising an annular base member having a gutter at one edge formed with a radially outwardly extending terminal wall and a bottom wall, a detachable annular tire retaining member movable over said terminal wall and encircling said base member and having a generally radially extending tire retaining flange and a tire bead seat portion, a clamping member between said base and tire retaining members and abutting said terminal wall and tire retaining member in the axially outer operative position of the latter, an endless annular sealing member in said gutter and making sealing contact with said bottom wall and with said tire bead seat portion in the operative position of said tire retaining member, said base member having an annular radially outwardly opening recess spaced axially inwardly of said gutter, a second endless annular sealing member located in said recess and compressed between and making sealing contact with said recess and tire bead seat portion, and means providing an abutment on said base member positively limiting said tire retaining member against movement from its operative position in an axially inward direction relative to said base member far enough to break the sealing contact between said tire bead seat portion and said second sealing member.

2. A rim for a tubeless tire comprising an annular base member having a gutter at one edge formed with a radially outwardly extending terminal wall and a bottom wall, a detachable annular tire retaining member movable over said terminal wall and encircling said base member and having a generally radially extending tire retaining flange and a tire bead seat portion, a clamping member between said base and tire retaining members and abutting said terminal wall and tire retaining member, an endless annular sealing member in said gutter and making sealing contact with said tire bead seat portion and said bottom wall, and a second endless annular sealing member carried by said base member axially inwardly of said first-mentioned sealing member and compressed between and making sealing contact with said base member and tire bead seat portion.

3. A rim for a tubeless tire comprising an annular base member having a gutter at one edge formed with a radially outwardly extending terminal wall and a bottom wall, a detachable annular tire retaining member movable over said terminal wall and encircling said base member and having a generally radially outwardly extending tire retaining flange and a tire bead seat portion, an endless clamping member extending within said gutter and abutting said terminal wall and tire retaining member in the axially outer operative position of the latter, said clamping member being resilient and having diametrically opposite clearances at its radially inner edge to facilitate buttoning on of said clamping member, an endless resilient stretchable sealing member of deformable material located in said gutter at the axially inner side of said clamping member and wedged between and making sealing contact with said bottom wall and with said tire bead seat portion in the operative position of said tire retaining member, said base member having an annular radially outwardly opening recess spaced axially inwardly from said gutter, a second endless resilient stretchable sealing member of deformable material permanently secured in said recess and compressed between and making sealing contact with said recess and said tire bead seat portion, and said base member being formed to provide an abutment positively limiting said tire retaining member against movement from its operative position in an axially inward direction relative to said base member far enough to break the sealing contact between said tire bead seat portion and said second sealing member, said abutment permitting sufficient axially inward movement of said tire retaining member to enable the insertion of said first-mentioned sealing member into said gutter between said tire retaining member and clamping member.

4. A rim for a tubeless tire comprising an annular base member having a gutter at one edge formed with a radially outwardly extending terminal wall and a bottom wall, a detachable annular tire retaining member movable over said terminal wall and encircling said base member and having a generally radially outwardly extending tire retaining flange and a tire bead seat portion, an endless clamping member extending within said gutter and abutting said terminal wall and tire retaining member in the axially outer operative position of the latter, an endless deformable sealing member located in said gutter at the axially inner side of said clamping member and wedged between and making sealing contact with said bottom wall and with said tire bead seat portion in the operative position of said tire retaining member, said base member having an annular radially outwardly opening recess spaced axially inwardly from said gutter, a second endless deformable sealing member permanently secured in said recess and compressed between and making sealing contact with said recess and said tire bead seat portion, and means providing an abutment on said base member positively limiting said tire retaining member against movement from its operative position in an axially inward direction relative to said base member far enough to break the sealing contact between said tire bead seat portion and said second sealing member, said abutment permitting sufficient axially inward movement of said tire retaining member to enable the insertion of said first-mentioned sealing member into said gutter between said tire retaining member and clamping member.

5. A rim for a tubeless tire comprising an annular base member having a radially outwardly extending terminal wall at one edge, a detachable annular tire retaining member movable over said terminal wall and encircling said base member and having a generally radially extending tire retaining flange and a tire bead seat portion, a clamping member between said base and tire retaining members and abutting said terminal wall and tire retaining member in the axially outer operative position of the latter, an endless annular sealing member carried by said base member at the axially inner side of said clamping member, said sealing member being located between and making sealing contact with said base and tire retaining members in the operative position of said tire retaining member, and a second endless sealing member caried by said base member axially inwardly of said first-mentioned sealing member and making sealing contact with said base and tire retaining members in all positions of said tire retaining member between its operative position and a position spaced axially inwardly from said operative position in which said tire retaining member is out of sealing contact with said first-mentioned sealing member.

6. A rim for a tubeless tire comprising an annular base member having a radially outwardly extending terminal wall at one edge, a detachable annular tire retaining member movable over said terminal wall and encircling said base member and having a generally radially extending tire retaining flange and a tire bead seat portion, a clamping member between said base and tire retaining members and abutting said terminal wall and tire retaining member in the axially outer operative position of the latter, an endless annular sealing member carried by said base member at the axially inner side of said clamping member, said sealing member being located between and making sealing contact with said base and tire retaining members in the operative position of said tire retaining member, and a second endless annular sealing member carried by said base member axially inwardly of said first-mentioned sealing member, said second sealing member being located between and making sealing contact with said base and tire retaining members and serving as an auxiliary seal in the event said tire retaining member moves from its operative position axially inwardly out of sealing contact with said first-mentioned sealing member as on severe cornering.

7. A rim for a tubeless tire comprising an annular base member having a gutter at one edge formed with a radially outwardly extending terminal wall and a bottom wall, a detachable annular tire retaining member movable over said terminal wall and encircling said base member and having a generally radially extending tire retaining flange and a tire bead seat portion, a clamping member between said base and tire retaining members and abutting said terminal wall and tire retaining member in the axially outer operative position of the latter, an endless sealing member in said gutter compressed between and making sealing contact with said bottom wall and said tire bead seat portion in the operative position of said tire retaining member, and a second endless sealing member carried by said base member axially inwardly of said first-mentioned sealing member and compressed between and making sealing contact with said base member and tire bead seat portion, said second sealing member being provided as an auxiliary seal in the event said tire retaining member moves from its operative position axially inwardly out of sealing contact with said first-mentioned sealing member as on severe cornering.

8. A rim as defined in claim 7 including means on said base member providing an abutment positively limiting said tire retaining member against movement from its operative position axially inwardly far enough to break the sealing contact between said tire bead seat portion and said second sealing member.

9. A rim for a tubeless tire comprising an annular base member having a gutter at one edge formed with a radially outwardly extending terminal wall and a bottom wall, a detachable annular tire retaining member movable over said terminal wall and encircling said base member and having a generally radially extending tire retaining flange and a tire bead seat portion, a clamping member between said base and tire retaining members and abutting said terminal wall and tire retaining member in the axially outer operative position of the latter, an endless sealing member in said gutter compressed between and making sealing contact with said bottom wall and said tire bead seat portion in the operative position of said tire retaining member, and a second endless sealing member carried by said base member axially inwardly of said first-mentioned sealing member and compressed between and making sealing contact with said base member and tire bead seat portion in all positions of said tire retaining member between its operative position and a preliminary inflatable position spaced axially inwardly from said operative position, said second sealing member thereby serving to prevent the escape of air from a tubeless tire carried by said rim during the inflation of the tire.

10. A rim for a tubeless tire comprising an annular base member, a detachable tire retaining member mounted on said base member in position to encircle the latter at one edge thereof in the normal operative position of said tire retaining member, means on said base member at said one edge thereof abutting said tire retaining member in its normal operative position to prevent movement of said tire retaining member relative to said base member axially outwardly beyond said normal operative position, said tire retaining member having a generally radially extending tire retaining flange and a tire bead seat portion, an endless annular sealing member mounted on said base member between said base and tire retaining members and compressed by and making sealing contact with said base and tire retaining members in the operative position of said tire retaining member, and a second endless annular sealing member mounted on said base member axially inwardly of said first-mentioned sealing member, said second sealing member being disposed between said base and tire retaining members and compressed by and making sealing contact with said base and tire retaining members in all positions of said tire retaining member between its operative position and a position spaced axially inwardly from said operative position in which said tire retaining member is out of sealing contact with said first-mentioned sealing member.

References Cited in the file of this patent

UNITED STATES PATENTS

| | | |
|---|---|---|
| 965,593 | Michelin | July 26, 1910 |
| 969,779 | Gammeter | Sept. 13, 1910 |
| 2,810,419 | Woodward | Oct. 22, 1957 |
| 2,835,303 | Woodward | May 20, 1958 |
| 2,894,556 | Darrow | July 14, 1959 |

FOREIGN PATENTS

| | | |
|---|---|---|
| 520,545 | Belgium | June 30, 1953 |
| (Corresponding English language patent, 744,085, Feb. 1, 1956, Great Britain.) | | |
| 1,098,290 | France | Mar. 2, 1955 |